(12) United States Patent
Mendler

(10) Patent No.: US 10,184,394 B2
(45) Date of Patent: Jan. 22, 2019

(54) VARIABLE COMPRESSION RATIO ENGINE

(71) Applicant: Edward Charles Mendler, Mill Valley, CA (US)

(72) Inventor: Edward Charles Mendler, Mill Valley, CA (US)

( * ) Notice: Subject to any disclaimer, the term of this patent is extended or adjusted under 35 U.S.C. 154(b) by 0 days.

(21) Appl. No.: 15/732,533

(22) PCT Filed: May 24, 2016

(86) PCT No.: PCT/US2016/000043
§ 371 (c)(1),
(2) Date: Nov. 24, 2017

(87) PCT Pub. No.: WO2016/195756
PCT Pub. Date: Dec. 8, 2016

(65) Prior Publication Data
US 2018/0328273 A1    Nov. 15, 2018

Related U.S. Application Data

(60) Provisional application No. 62/230,277, filed on Jun. 1, 2015, provisional application No. 62/386,903, filed (Continued)

(51) Int. Cl.
*F02B 75/04*    (2006.01)
*F02D 15/00*    (2006.01)
(Continued)

(52) U.S. Cl.
CPC ............ *F02B 75/041* (2013.01); *F02D 15/00* (2013.01); *F16J 3/042* (2013.01); *F16J 15/52* (2013.01)

(58) Field of Classification Search
CPC ........ F02B 75/04; F02B 75/041; F02D 15/00; F02D 15/02
See application file for complete search history.

(56) References Cited

U.S. PATENT DOCUMENTS 4,174,683 A    11/1979    Vivian
5,611,301 A     3/1997    Gillbrand
(Continued)

*Primary Examiner* — Grant Moubry

(57) ABSTRACT

According to the present invention a variable compression ratio engine having a pair of eccentric control shafts, a crankcase and a cylinder jug has contiguous metal casting bearing sockets located in the crankcase for supporting the eccentric control shaft, and an eccentric control shaft axis location close in to the working cylinders, and located between the bottom edge of the working cylinders and the floor of the water jacket, thereby providing a rigid and compact crankcase and cylinder jug assembly. Nesting of the eccentric control shafts under the water jacket and close in to the cylinder bores, and also eliminating use of removable bearing caps in the crankcase provides a compact and rigid crankcase and cylinder jug assembly. Side walls that extend above and below the eccentric control shafts provide added rigidity and also enclose the crankcase for containing oil within the crankcase. Internal webbing within the crankcase provides added rigidity and provides an aerodynamic crankcase interior and an oil drain back passageway for reduced internal aerodynamic drag on the cranktrain at high engine speeds. A major benefit of the present invention is that it is robust and can support the large forces encountered in internal combustion engines. Another benefit of the present invention is that removable bearing caps are not required, resulting in a lower cost and a smaller size than prior art engines having removable bearing caps.

23 Claims, 7 Drawing Sheets

Related U.S. Application Data on Dec. 14, 2015, provisional application No. 62/388,596, filed on Feb. 1, 2016.

(51) Int. Cl.
*F16J 3/04* (2006.01)
*F16J 15/52* (2006.01)

(56) References Cited

U.S. PATENT DOCUMENTS

| | | | |
|---|---|---|---|
| 7,036,468 B2 * | 5/2006 | Kamiyama | F02B 75/041 |
| | | | 123/78 R |
| 7,047,917 B2 | 5/2006 | Akihisa | |
| 7,806,092 B2 | 10/2010 | Kamiyama | |
| 7,917,279 B2 * | 3/2011 | Akihisa | F02B 31/085 |
| | | | 123/48 C |
| 7,997,241 B2 * | 8/2011 | Kamiyama | F01L 13/0015 |
| | | | 123/90.17 |
| 8,392,095 B2 * | 3/2013 | Nakasaka | F02D 13/0246 |
| | | | 123/48 C |
| 8,671,894 B2 | 3/2014 | Kodama | |
| 9,410,489 B2 * | 8/2016 | Miyazono | F02D 15/04 |
| 2004/0035376 A1 | 2/2004 | Hoffmann | |
| 2010/0163002 A1 | 7/2010 | Kamiyama | |
| 2014/0283786 A1 | 9/2014 | Nakasaka | |

* cited by examiner

VARIABLE COMPRESSION RATIO ENGINE

This application relates to Provisional Application No. 62/230,277 having a filing date of Jun. 1, 2015, Provisional Application No. 62/386,903 having a filing date of Dec. 14, 2015, and Provisional Application No. 62/388,596 having a filing date of Feb. 1, 2016

BACKGROUND OF THE INVENTION

Prior art engines have been designed that have a pair of eccentric control shafts for adjusting engine compression ratio. These engines have a piston slidably mounted in a working cylinder, a crankshaft mounted in a crankcase, and a connecting rod for connecting the piston to the crankshaft. The working cylinder is formed in a cylinder jug that is movable relative to the crankcase for adjusting the compression ratio of the engine. The eccentric control shafts form two expand expandable hinge pin joints. Bushings in the crankcase form a first half of the hinged joint, and bushings in the cylinder jug form the second half of the hinged joint. The control shafts are a form of hinge pins and have off-set journal bearings. Rotating the two control shafts in unison adjusts the position of the cylinder jug relative to the crankshaft and thereby adjusts the compression ratio of the engine. The control shafts are typically located on opposite sides of the engine and parallel to the crankshaft to provide stable support of the cylinder jug in the crankcase.

The prior art engine designs having a pair of eccentric control shafts typically employ removable bearing caps located on the crankcase for assembly of the eccentric control shaft in the engine. A problem with these engines is that they would be expensive to manufacture and expensive to assemble due to the large number of bearing caps that need to be bolted together. A second problem is low mechanical stiffness and strength. The problem of low strength and stiffness is compounded in engines where the parting line of the bearing cap is oriented vertically, rather than horizontally for best supporting the high mechanical forces encountered in internal combustion engines. A number of prior art designs have eccentric control shaft bearings that are not mechanically functional because the bearings are too small. Another problem with these engines is size and weight. Regarding size, a large distance or bridging distance between the eccentric control shafts can results in excessive bending of the crankcase when it is under load. A large bridging distance can also result in excessive thermal expansion distortion between the crankcase and cylinder jug. A narrow engine is also needed for fitting the engine in existing engine bays, and a light weight engine is needed for minimizing vehicle fuel consumption. The crankcase must also be sealed for containing engine oil inside of the crankcase. A number of prior art designs do not teach how to enclose the crankcase. Specifically, these prior art engine designs do not teach how to assemble the control shafts in the crankcase without removable bearing caps or by other means, or how to provide the necessary crankcase sealing.

A variable compression ratio engines having dual eccentric control shafts is taught by Eichi Kamiyama shows in U.S. Pat. No. 7,806,092, and Akihisa et al. in U.S. Pat. No. 7,047,917. Eichi Kamiyama shows a variable compression ratio engine having an eccentric hinge pin assembly 25c, 25c1, 25c2, 25c3 and 25c4 retained in crankcase bearing caps 25a, 25a2 and jug bearing caps or bearing blocks 25b. Crankcase bearing caps 25a2 are bolted to crankcase 21, and jug bearing caps or bearing blocks 25b are bolted to jug 23. Both the crankcase and the cylinder jug have removable bearing caps. A problem with the invention taught in U.S. Pat. Nos. 7,806,092 and 7,047,917 is that it is expensive to manufacture and expensive to assemble due to the large number of bearing caps that need to be bolted to the jug and crankcase. A second problem is low mechanical stiffness and strength.

Another variable compression ratio engines having an adjustable distance between the cylinder head and crankshaft is taught by Howard C. Vivian in U.S. Pat. No. 4,174,683. The Vivian engine includes a crankcase or crankcase sub assembly (12), an upper cylinder head (10) and a cylinder block or cylinder jug (11). Cylinder block or cylinder jug (11) is connected to the crankcase (12) with a pair of eccentric shafts or control shafts (13 and 14). Vivian does not teach how to assemble eccentric control shafts (13 and 14) in cylinder jug (11) and crankcase (12) without having removable bearing caps, and Vivian does not teach how to provide a sturdy crankcase that is enclosed for containing engine oil within the crankcase.

Another variable compression ratio engines having an adjustable distance between the cylinder head and crankshaft is taught by Kodama of Toyota in U.S. Pat. No. 8,671,894. The Kodama engine includes a lower crankcase (22), an upper cylinder head (3) and a cylinder block or cylinder jug (2). Kodama does not teach how to provide a sturdy and compact variable compression ratio crankcase.

Another variable compression ratio engine having a pair of eccentric control shafts is taught by Werner Hoffmann in US Publication Number US 2004/0035376 A1 of Feb. 26, 2004. Hoffman shows a cylinder jug (1) having eccentric control shafts (4) and removable bearing caps for securing eccentric control shafts (4) in crankcase (2). The eccentric control shafts are located near the top of the cylinder jug, and outboard of the water jacket. Locating the eccentric control shafts (4) near the top of the cylinder jug (1) results in a large spacing or bridging distance between the control shafts in order to clear the water jacket. The large bridging distance is undesirably large for providing a compact and rigid engine design. To minimize the bridging distance Hoffman uses undersized removable bearing caps for securing the eccentric control shafts (4) in the crankcase (1), where it can be seen (in FIG. 5) that the parting line surface of the bearing cap is too small and not mechanically sound.

Accordingly, an objective of the present invention is to provide a variable compression ratio engine having dual eccentric control shafts that is sturdy, rigid and compact. In more detail, an objective of the present invention is to provide a variable compression ratio mechanism having robust bearing housings for dual eccentric control shafts, closely spaced control shafts to provide a narrow engine with a small bridging distance between the eccentric control shafts to minimize structural bending and thermal distortion when the engine is running, and large enough control shafts and large enough control shaft bearings to support the high combustion loads of the engine. A narrow engine is also needed for fitting the engine into current production engine bays, where packaging an engine into an existing car model is exceptionally difficult. Another objective of the present invention is to provide a sealed crankcase for containing engine oil within the crankcase. Another objective is to provide an engine design that is inexpensive to manufacture and assemble.

SUMMARY OF THE INVENTION

According to the present invention a variable compression ratio engine having a pair of eccentric control shafts, a crankcase and a cylinder jug has contiguous metal casting bearing sockets located in the crankcase for supporting the eccentric control shaft; a horizontal eccentric control shaft axis location close in to the working cylinders; and a vertical eccentric control shaft axis location between the bottom edge of the working cylinders and the floor of the water jacket, thereby providing a rigid and compact crankcase and cylinder jug assembly. Nesting of the eccentric control shafts under the water jacket and close in to the cylinder bores, and also eliminating use of removable bearing caps in the crankcase provides a compact and rigid crankcase and cylinder jug assembly.

Side walls that extend above and below the eccentric control shafts provide added rigidity and also enclose the crankcase for containing oil within the crankcase. Internal webbing within the crankcase provides added rigidity and provides an aerodynamic crankcase interior and an oil drain back passageway for reduced internal aerodynamic drag on the cranktrain at high engine speeds. A major benefit of the present invention is that it is robust and can support the large forces encountered in internal combustion engines. Another benefit of the present invention is that removable bearing caps are not required, resulting in a lower cost and a smaller size than prior art engines having removable bearing caps.

DETAILED DESCRIPTION OF THE PREFERRED EMBODIMENTS

Figure 1:
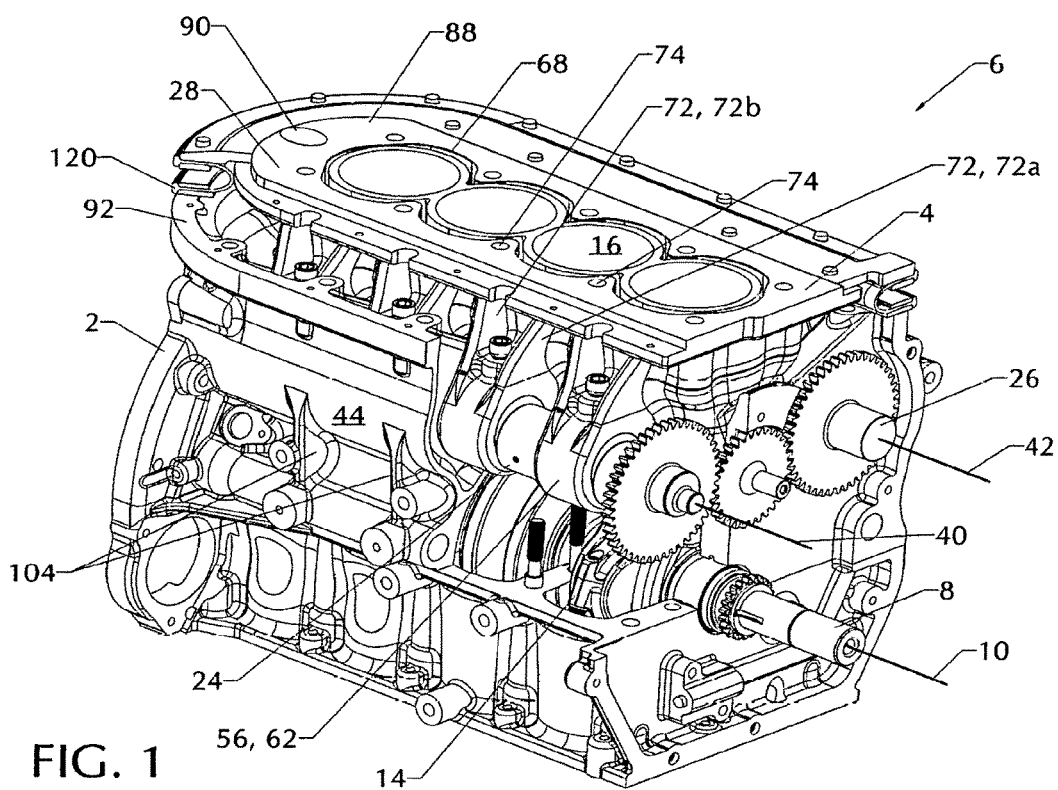
FIG. 1 is intended to schematically illustrate a variable compression ratio engine having dual eccentric control shafts according to the present invention.
Figure 4:
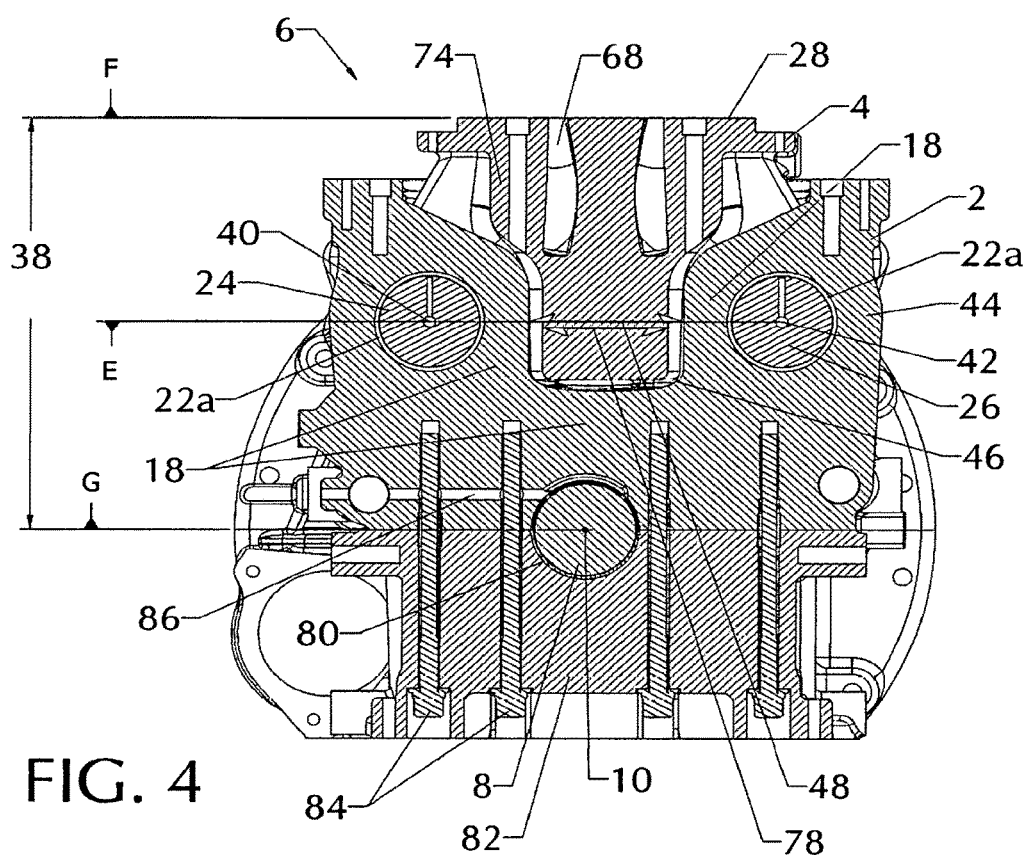
FIG. 4 is a section view of the variable compression ratio engine taken on plane B shown in FIG. 2 and for a maximum compression ratio setting.

FIG. 1, through 4 are intended to illustrate a rigid variable compression ratio crankcase 2 and a rigid cylinder jug 4 assembly for a variable compression ratio engine 6. Variable compression ratio engine 6 has a crankshaft 8 defining a crankshaft axis of rotation 10, and at least one piston 12 and at least one connecting rod 14. Cylinder jug 4 further includes a cylinder bore 16 for receiving piston 12.

Figure 3:
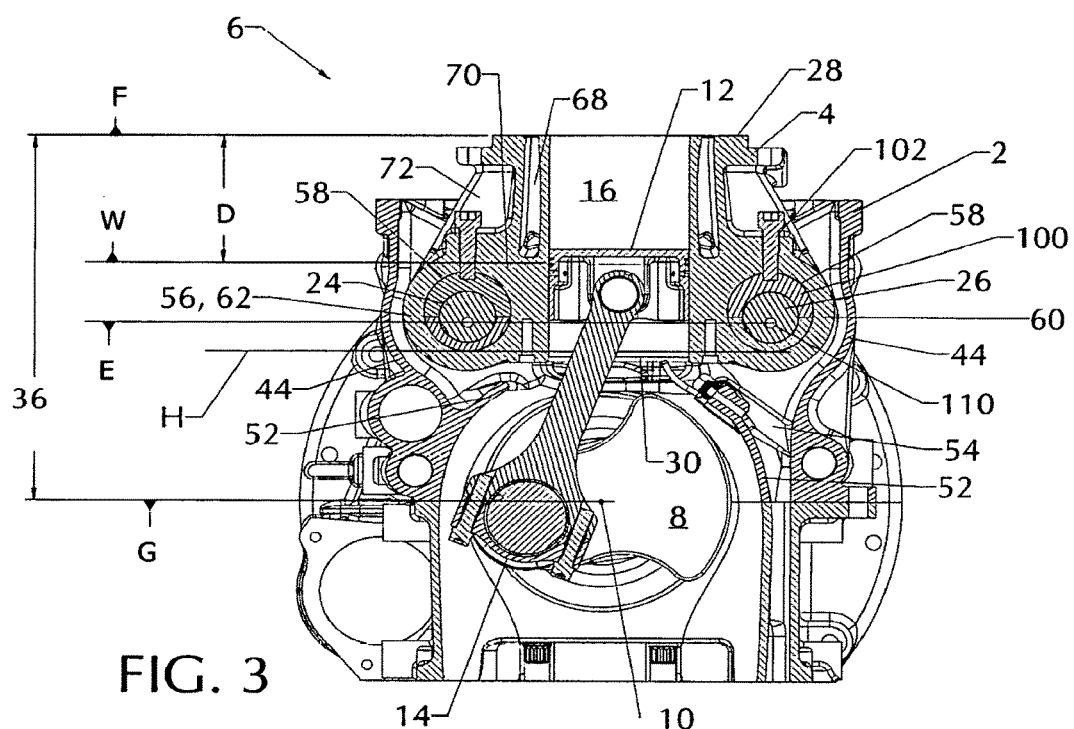
FIG. 3 is a section view of the variable compression ratio engine taken on plane A shown in FIG. 2 and for a minimum compression ratio setting.

Cylinder jug 4 has a cylinder bore plane A. Cylinder bore plane A passes through the center of cylinder bore 16 and is perpendicular to crankshaft axis 10. FIG. 3 is a sectional view of variable compression ratio engine 6 taken on cylinder bore plane A.

Crankcase 2 has a contiguous metal casting forming at least a first bulkhead 18 and a second bulkhead 20. First bulkhead 18 has two crankcase bearing sockets 22a, or more generally crankcase bearing sockets 22. Crankcase bearing sockets 22a pass through contiguous metal casting 18 and are centered generally on a common first bulkhead plane B.

FIG. 4 is a sectional view of variable compression ratio engine 6 taken on first bulkhead plane B.

Second bulkhead 20 has two crankcase bearing sockets 22b. Crankcase bearing sockets 22b pass through contiguous metal casting 20 and are centered generally on a common second bulkhead plane C.

Variable compression ratio crankcase 2 further has a first eccentric control shaft 24 and a second eccentric control shaft 26. Preferably at least a portion of control shafts 24 and 26 are free to axially slide into crankcase bearing sockets 22 having contiguous metal casting 18 and into in variable compression ratio engine 6 for assembly of the variable compression ratio mechanism.

Figure 5:
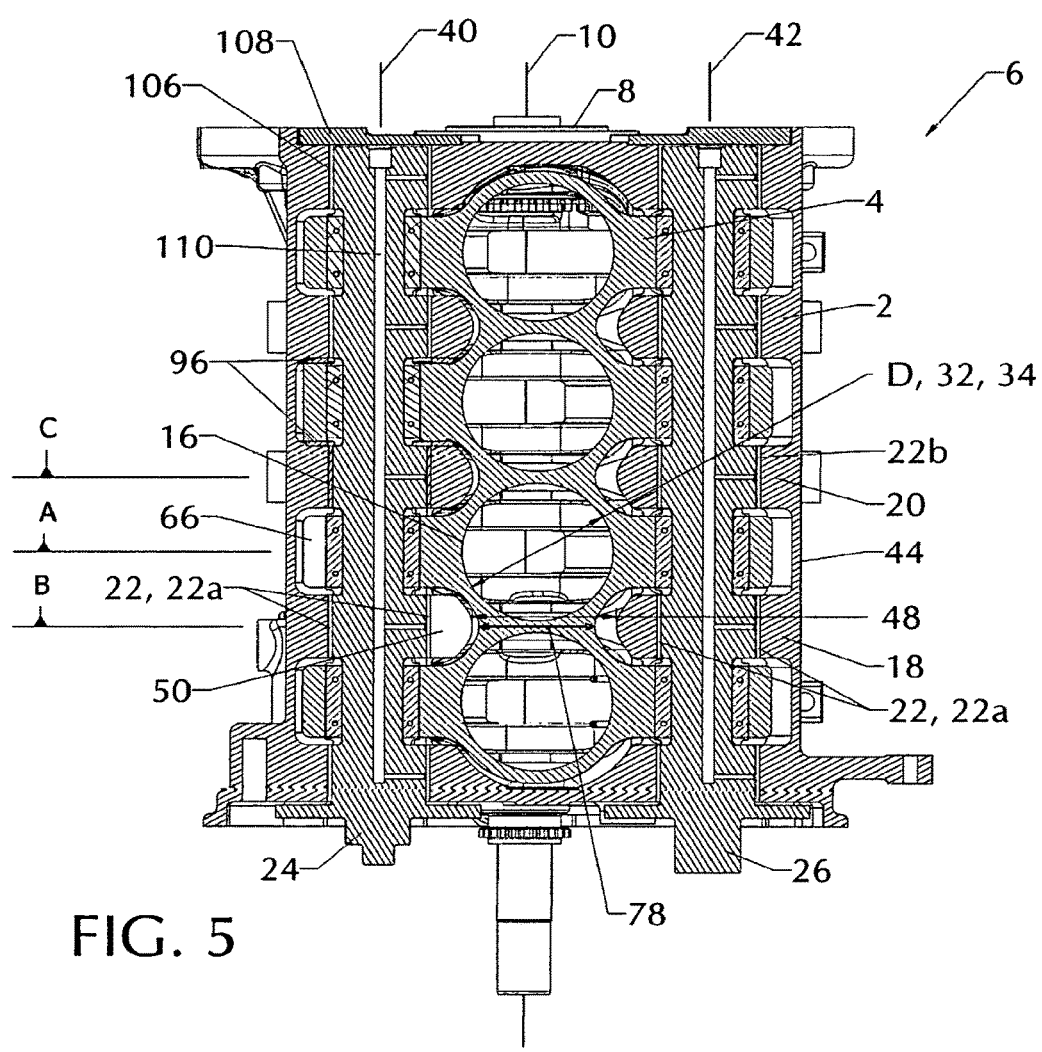
FIG. 5 is a section view of the variable compression ratio engine taken on plane E shown in FIG. 3.
Figure 6:
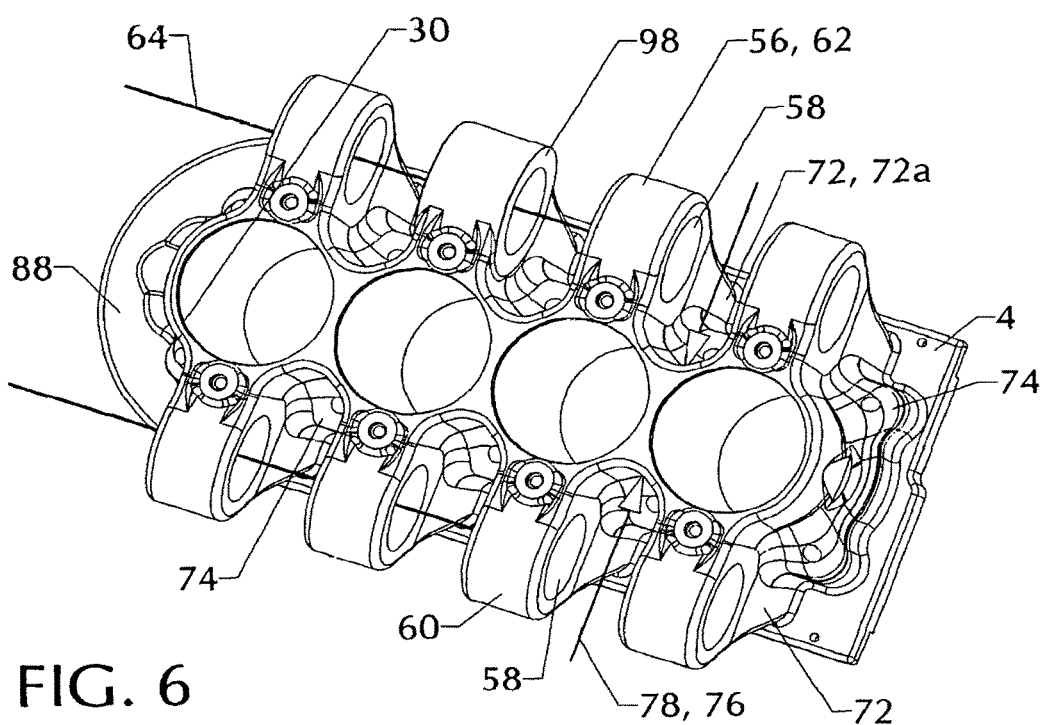
FIG. 6 is a detailed view of the cylinder jug.

Cylinder jug 4 further has a deck 28 for mounting of a cylinder head. Deck 28 defines a deck plane F. Referring now to FIGS. 3, 5 and 6, cylinder bore 16 has a cylinder bottom edge 30 and a cylinder bore diameter 32. Cylinder bottom edge 30 is the edge of cylinder bore 16 closest to crankshaft 8 that has a finished surface in sliding contact with piston 12. Cylinder bore diameter 32 defines a cylinder bore cross sectional area 34 equal to $\pi D^2/4$, where the letter D represents the cylinder bore diameter.

Referring now to FIG. 3, variable compression ratio engine 6 has a first compression ratio spacing 36 between deck plane F and crankshaft axis 10 for providing a minimum compression ratio. Referring now to FIG. 4, variable compression ratio engine 6 has a second compression ratio spacing 38 between deck plane F and crankshaft axis 10 for providing a maximum compression ratio. Rotation of eccentric control shafts 24 and 26 adjusts the spacing between deck plane F and crankshaft axis 10 for adjusting the compression ratio of variable compression ratio engine 6.

Referring now to FIGS. 1 and 4, first eccentric control shaft 24 has a first axis 40. First axis 40 is located in crankcase 2. Second eccentric control shaft 26 has a second axis 42 located in crankcase 2. First axis 40 and second axis 42 further define a common control shaft plane E in crankcase 2. Common control shaft plane E is located at mid-bore height between deck plane F and cylinder bottom edge 30 (shown in FIG. 3) for providing a rigid and narrow variable compression ratio crankcase. Control shafts 24 and 26 are generally nested below water jacket reference plane W and close to cylinder bores 16 for minimizing the bridging distance between the two control shafts.

Crankcase 2 has rigid side walls 44. The rigid side walls 44 are located between first bulkhead 18 and second bulkhead 20, and extending above and below common control shaft plan E for enclosing the crankcase 2 and for providing axial stiffness of crankcase 2 between the bulkheads.

Figure 2:
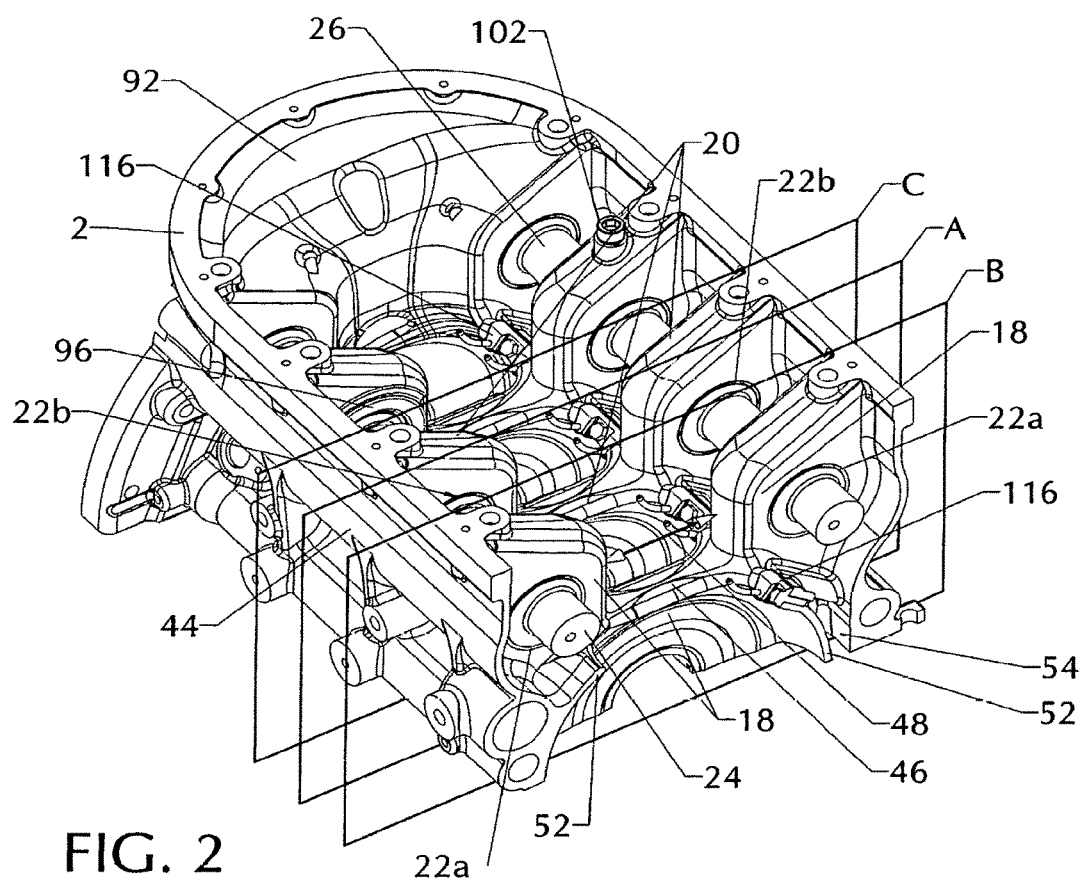
FIG. 2 shows the crankcase and eccentric control shafts with the cylinder jug removed according to the present invention.

Referring now to FIGS. 2 and 4, first bulkhead 18 having rigid side walls 44 further includes a deep inner saddle 46 between crankcase bearing sockets 22a and passing through common control shaft plane E for installation of cylinder jug 4 in variable compression ratio engine 6.

According to the present invention crankcase 2 has a common control shaft plane E located at a mid-bore height between deck plane F and cylinder bottom edge 30; control shaft bearing sockets 22 centered on common control shaft plane E; contiguous metal casting around crankcase bearing sockets 22 in bulkheads 18 and 20 to provide rigid support of the bearings; rigid side walls 44 extending above and below common control shaft plane E for further strengthening bulkheads 18 and 20; and a deep inner saddle 46 passing through common plane E for installation of cylinder jug 4 in variable compression ratio engine 6, thereby providing a narrow and rigid variable compression ratio crankcase.

Referring now to FIG. 3, cylinder jug 4 further includes a water jacket 68. Water jacket depth reference plane W is parallel to deck plane F and the distance between water jacket reference plane W and deck plane F is equal to cylinder bore diameter D. Water jacket depth varies around the engine, while water jacket reference plane W provides a specific dimension for the purpose of describing the present invention.

According to the preferred embodiment of the present invention crankcase 2 has a common control shaft plane E located between water jacket reference plane W and cylinder bottom edge 30; control shaft bearing sockets 22 centered on common control shaft plane E; contiguous metal casting around crankcase bearing sockets 22 in bulkheads 18 and 20 to provide rigid support of the bearings; rigid side walls 44 extending above and below common control shaft plane E for further strengthening bulkheads 18 and 20; and a deep inner saddle 46 passing through common plane E for installation of cylinder jug 4 in variable compression ratio engine 6, thereby providing a narrow and rigid variable compression ratio crankcase. In general, eccentric control shafts 24 and 26 are nested under water jacket 68 for minimizing the bridging distance between the two shafts for maximizing crankcase rigidity and minimizing engine width.

In more detail, according to the present invention variable compression ratio engine 6 has a pair of eccentric control shafts 24 and 26, a crankcase 2 and a cylinder jug 4 having contiguous metal casting bearing sockets 22 located in the crankcase 2 for supporting the eccentric control shaft 24 and 26, and an eccentric control shaft axis location 40 and 42 close in to the working cylinders 16, and located between the bottom edge 30 of the working cylinders 16 water jacket reference plane W, thereby providing a rigid and compact crankcase 2 and cylinder jug 4 assembly. Nesting of the eccentric control shafts 24 and 26 under the water jacket 68 and close in to the cylinder bores 16, and also eliminating use of removable bearing caps in the crankcase, provides a compact and rigid crankcase 2 and cylinder jug 4 assembly.

Referring now to FIGS. 2 and 4, deep inner saddle 46 has a saddle opening width 48. Saddle opening width 48 is measured on common control shaft plane E. Saddle opening width 48 is preferably no more than 1.12 times cylinder bore diameter D, thereby providing a narrow crankcase 2 while also providing space for contiguous metal casting around bearing sockets 22a in first bulkhead 18, and in more detail providing enough space for a sturdy enough casting.

Referring now to FIGS. 4 and 5, crankcase bearing sockets 22a have an inner cross sectional area 50 measured on said common control shaft plane E. The cross hatching has been removed from inner cross sectional area 50 where shown by the leader line in FIG. 5 in order to better display the cross sectional area. Preferably, according to the present invention, inner cross sectional area 50 is at least eight percent (8%) of said cylinder bore cross sectional area 34, thereby providing robust bearing support structure.

Referring now to FIGS. 2 and 3, crankcase 2 has a crankshaft horizontal plane G passing through crankshaft axis of rotation 10 and also parallel to common control shaft plane E. According to the present invention, preferably crankcase 2 further including cross webbing 52 between first bulkhead 18 and second bulkhead 20. The cross webbing 52 is located generally between common control shaft plane E and crankshaft axis of rotation 10 or crankshaft horizontal plane G, thereby providing a rigid and internally aerodynamic crankcase.

Preferably, according to the present invention, cross webbing 52 and rigid side walls 44 form an oil drain back passageway 54 for directing engine oil away from the spinning crankshaft 8 for minimizing aerodynamic losses and maximizing engine efficiency and power. Drain back passageway 54 provides for an open passageway between first bulkhead B and second bulkhead C and between common control shaft plan E to below crankshaft horizontal plane G for drainage of engine oil. FIGS. 2 and 3 also show engine oil jets 116 for squirting oil towards the underside of pistons 12, for cooling the piston and lubricating cylinder bores 16.

Referring now to FIGS. 1, 3, 5 and 6, cylinder jug 4 further has a contiguous metal casting forming at least a first cylinder jug bearing housing 56 having a cylinder jug bearing surface 58, and a second cylinder jug bearing housing 60 also having a cylinder jug bearing socket surface 58. First cylinder jug bearing housing 56 and second cylinder jug bearing housing 60 are located generally on cylinder bore plane A or between first bulkhead plane B and second bulkhead plane C. Preferably, according to the present invention, first cylinder jug bearing housing 56 has a contiguous metal casting 62 that encircles jug bearing socket surface 58, thereby providing a narrow and rigid cylinder jug.

Bearing socket surface 58 defines a bearing socket axis 64. Preferably, according to the present invention, cylinder jug bearing housings 56 and 60 have an outer cross sectional area 66. The cross hatching has been removed from outer cross sectional area 66 where shown by the leader line in FIG. 5 in order to better display the cross sectional area. Referring now to FIG. 5, outer cross sectional area 66 is measured on common control shaft plane E, and in more detail when bearing socket axis 64 is located on common control shaft plane E. Preferably, according to the present invention, outer cross sectional area 66 is at least eight percent (8%) of said cylinder bore cross sectional area 34, thereby providing robust bearing support structure.

Referring now to FIGS. 3 and 6, cylinder jug bearing socket surfaces 58 define a common bearing lower plane H, where common control shaft plane H touches cylinder bearing socket surfaces 58 and is located as close as possible to crankshaft axis of rotation 10. Optionally common bearing lower plane being parallel H is located between water jacket reference plane W and bottom edge 30, thereby providing a rigid cylinder jug bearing housing.

Referring now to FIGS. 1, 3, 4 and 7, cylinder jug 4 further includes a water jacket 68. Water jacket 68 and cylinder jug bearing socket surface 58 preferably have a common lower wall section 70. Common lower wall section 70 is located generally on cylinder bore plane A, and in some embodiments has added thickness for providing a rigid and narrow cylinder jug and a deep water jacket. Preferably wall section 70 is solid metal between water jacket 68 and cylinder jug bearing socket surface 58 for maximizing cylinder jug stiffness.

Referring now to FIGS. 1, 3, 4 and 6, preferably cylinder jug 2 further includes structural webbing 72 extending from cylinder jug bearing housing 56 to deck 28, thereby providing a rigid cylinder jug structure. Cylinder jug 4 further includes cylinder head bolt anchorages 74. Preferably structural webbing 72 extends generally from cylinder jug bearing housing 56 towards said cylinder head bolt anchorages 74, thereby providing a rigid cylinder jug structure. Structural webbing 72 is preferably curved and inclined for structurally joining cylinder head bolt anchorages 74 and cylinder jug bearing housings 56.

Referring now to FIGS. 1, 3 and 6, preferably, cylinder jug bearing housing 56 includes a first webbing 72a extending generally towards a cylinder head bolt anchorage 74 located generally on first bulkhead plane B, and a second webbing 72b extending generally towards a cylinder head bolt anchorage 74 located generally on first bulkhead plane C, thereby providing a rigid cylinder jug structure.

Referring now to FIGS. 1, 5 and 6, cylinder jug 4 has deep sockets 76 between adjacent cylinder jug bearing housings 56 and 60 for providing mechanical clearance from the contiguous metal castings 18 around the crankcase bearing sockets 22. Cylinder jug 4 has a maximum fitting width 78 for installation of cylinder jug 4 in saddle opening 46 without mechanical interference. The maximum fitting width 78 is measured on first bulkhead plane B between said deep sockets 76, and on common control shaft plane E and in more detail when bearing socket axis 64 is located on common control shaft plane E. Preferably, according to the present invention, maximum fitting width 78 is no more than ninety percent (90%) of said cylinder bore diameter D, thereby providing a narrow crankcase 2 while also providing space for contiguous metal casting around bearing sockets 22a in first bulkhead 18, and in more detail providing enough space for a sturdy enough casting.

Preferably deep inner saddle 46 has a saddle opening width 48, saddle opening width being measured on common control shaft plane E when bearing socket axis 64 is located on common control shaft plane E, and the saddle opening width 48 is no more than 1.12 times cylinder bore diameter D. Preferably cylinder jug 4 having cylinder head bolt anchorages 74 that are through drilled into deep sockets 76.

Referring now to FIG. 4, crankcase 2 includes has crankshaft bearings 80, and a crankshaft lower bearing housing, bedplate or bearing cap 82. Crankcase 2 further includes main fasteners 84 for securing lower bearing housing 82 to crankcase 2. Crankcase 2 further has oil feed lines 86 for supplying engine oil to crankshaft bearings 80.

Preferably, according to the present invention, an oil feed line 86 and at least one main fastener 84 are generally centered in first bulkhead plane B, and oil feed line 86 crosses main fastener 84 for oil flow around main fastener 84 to crankshaft bearing 80.

Preferably main fasteners 84 have a narrower shank or a relief for a larger oil flow passageway around fastener 84, and in more detail the diameter of the fastener shank is preferably smaller than the outer diameter of the fastener thread where oil feed line 86 crosses main fastener 84.

Figure 7:
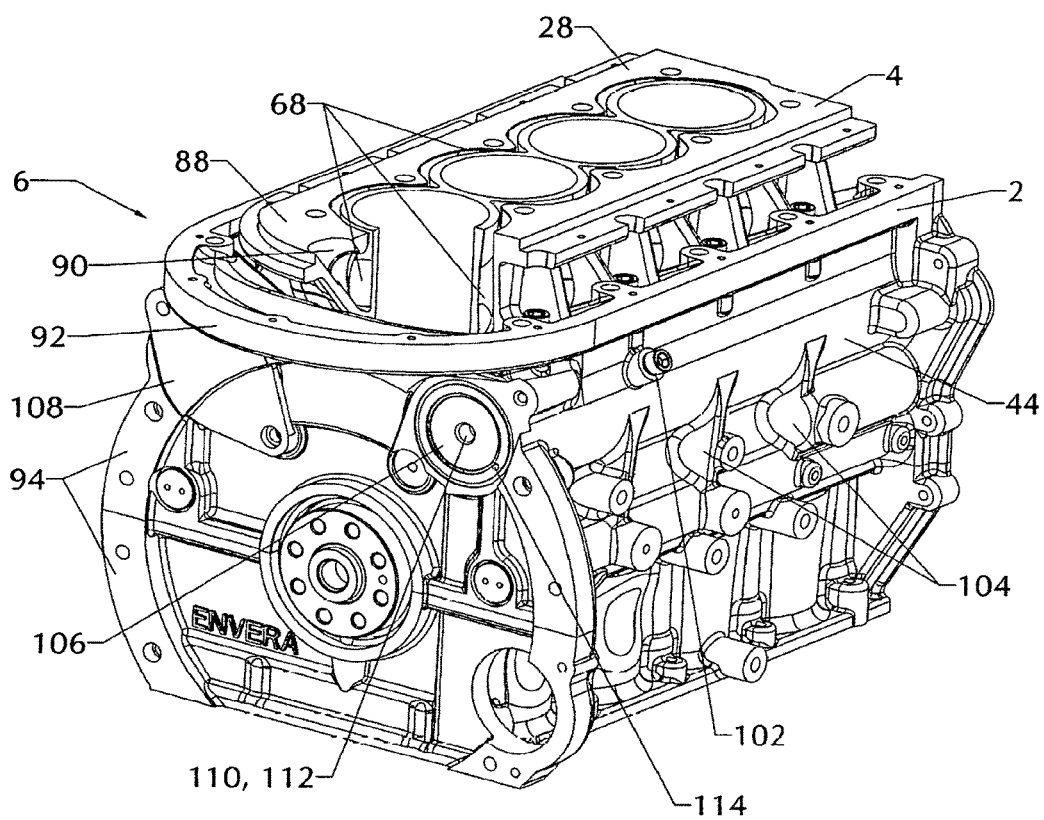
FIG. 7 is intended to schematically illustrate a rear view of the variable compression ratio engine having dual eccentric control shafts according to the present invention.

Referring now to FIGS. 1, 6, and 7, cylinder jug 4 including water jacket 68, optionally including a bib or rear bib 88 on deck 28. Bib 88 may optionally be located in an alternative location, such as the side of cylinder jug 4 closer to second bulkhead plane C. Bib 88 preferably includes a water inlet passage 90 for feeding cooling water into said water jacket 68 from above deck 28.

Preferably crankcase 2 has a crankcase pocket wall 92 for enclosing bib 88 inside crankcase 2. Crankcase pocket wall 92 optionally extends over a bellhousing flange 94, thereby providing a cooling water inlet without significantly increasing the overall length of variable compression ratio engine 6. Water outlet passageways are typically provided in the cylinder head. An inlet water passageway may optionally be provided in the cylinder head for feeding water into water inlet passageway 90. An engine knock sensor may also be accessed through bib 88 or a secondary bib.

Referring now to FIGS. 2, 5 and 6, variable compression ratio engine 6 further includes thrust bearings 96 for alignment of cylinder jug 4 in crankcase 2. Optionally thrust bearing 96 are located between crankcase 2 and cylinder jug 4 and in more detail between a crankcase bulkhead 20 and a cylinder jug bearing housing 56. Referring now to FIG. 6, a thrust bearing surface 98 may optionally be formed on cylinder jug bearing housing 56. Preferably thrust bearings 96 are generally concentric with eccentric control shaft 24 or 26.

Referring now to FIGS. 1, 2, 3, and 7, crankcase 2 may optionally include eccentric bushings 100 located in cylinder jug 4 or crankcase 2. Optionally a locking fastener 102 may be located in cylinder jug 4 or crankcase 2 for locking eccentric bushing 100 in place in cylinder jug 4 or crankcase 2.

Preferably crankcase 2 further has external ribbing 104 located on the outer surface of side walls 44 for providing a stiffer crankcase.

Referring now to FIGS. 2 and 5, crankcase 2 has an end control shaft bearing socket 106 and a rear cover plate 108 for sealing end bearing socket 106. The rear cover plate 108 for eccentric control shaft 24 has been removed to show the internal oil flow passageways. Eccentric control shaft 24 preferably has internal oil galleys 110 having an oil inlet 112 for supplying oil to bearing sockets 22 and/or cylinder jug bearing sockets 58. Crankcase 2 further has an oil feed line 114 for supplying oil to end crankcase bearing socket 106. Oil feed galley 114 and internal oil galley 110 are in fluid communications inside of rear cover plate 108.

Referring now to FIG. 1, variable compression ratio engine 6 includes a seal 120 for sealing crankcase 2 for containing engine oil within the crankcase.

The invention claimed is:

1. A rigid variable compression ratio crankcase (2) and cylinder jug (4) assembly for a variable compression ratio engine (6), said variable compression ratio engine (6) having a crankshaft (8) and at least one piston (12) and at least one connecting rod (14), said variable compression ratio engine (6) having a maximum compression ratio setting (38) and a minimum compression ratio setting (36), said crankcase (2) further having a contiguous metal casting forming at least a first and a second bulkhead (18 and 20), said first bulkhead (18) having two crankcase bearing sockets (22a), said crankcase bearing sockets (22a) passing through said contiguous metal casting and being centered generally on a common first bulkhead plane (B), and, said second bulkhead (20) having two crankcase bearing sockets (22b), said crankcase bearing sockets (22b) passing through said contiguous metal casting and being centered generally on a common second bulkhead plane (C), said crankcase (2) further having two eccentric control shafts (24 and 26), at least a portion of said control shafts being free to axially slide into said variable compression ratio engine (6) for assembly of said variable compression ratio mechanism, and said cylinder jug (4) further having a deck (28) for mounting of a cylinder head, and a cylinder bore (16) for receiving said piston (12), said cylinder bore (16) having a cylinder bottom edge (30), a cylinder bore diameter (D), and a cylinder bore cross sectional area (34), wherein, said first eccentric control shaft (24) has a first axis (40) located in said crankcase (2), and said second eccentric control shaft (26) has a second axis (42) located in said crankcase (2), said first axis (40) and said second axis (42) further defining a common control shaft plane (E) in said crankcase (2), said common control shaft plane (E) being located between said deck (28) and said bottom edge (30), and, said crankcase (2) having rigid side walls (44) between said bulkheads (18 and 20) and extending above and below said common control shaft plane (E) for enclosing said crankcase (2) and for providing axial stiffness of said crankcase between said bulkheads (18 and 20), said first bulkhead (18) having said rigid side walls (44) further includes a deep inner saddle (46) between said crankcase bearing sockets (22) and passing through said common control shaft plane (E) for installation of said cylinder jug (4), wherein said crankcase has bearing sockets (22) for two eccentric control shafts (24 and 26); rigid side walls (44) extending above and below said common control shaft plane (E); contiguous metal casting around said crankcase bearing sockets (22); and said deep inner saddle (46) passing through said common plane (E) for installation of said cylinder jug (4), thereby providing a narrow and rigid variable compression ratio crankcase.

2. The rigid variable compression ratio crankcase and cylinder jug assembly of claim 1, further including a water jacket (68), and a water jacket depth reference plane (W), water jacket depth reference plane (W) being parallel to deck plane (F), the space between deck plane (F) and water jacket depth reference plane (W) being equal to bore diameter (D), wherein, common control shaft plane E is located between water jacket reference plane W and cylinder bottom edge 30 for closely nesting the eccentric control shafts (24 and 26) under water jacket (68) and close to cylinder bore (16).

3. The rigid variable compression ratio crankcase and cylinder jug assembly of claim 1, wherein said deep inner saddle (46) has a saddle opening width (48), said saddle opening width (48) being measured on said common control shaft plane (E), wherein said saddle opening width (48) is no more than 1.12 times said cylinder bore diameter (D).

4. The rigid variable compression ratio crankcase and cylinder jug assembly of claim 1, wherein said crankcase bearing sockets (22) have an inner cross sectional area (50) measured on said common control shaft plane (E), wherein said inner cross sectional area (50) is at least eight percent of said cylinder bore cross sectional area (34), thereby providing robust bearing support structure.

5. The rigid variable compression ratio crankcase and cylinder jug assembly of claim 1, wherein said crankshaft (8) defines a crankshaft rotational axis (10), and a crankshaft horizontal plane (G) passing through said crankshaft rotational axis (10) and being parallel to said common control shaft plane (E), said crankcase (2) further including cross webbing (52) between said first bulkhead (18) and said second bulkhead (20), said cross webbing (52) being located generally between said common control shaft plane (E) and said crankshaft horizontal plane (G), thereby providing a rigid and internally aerodynamic crankcase.

6. The rigid variable compression ratio crankcase and cylinder jug assembly of claim 5, wherein said cross webbing (52) and said rigid side wall (44) forms an oil drain back passageway (54), thereby directing engine oil away from the spinning crankshaft (8) for minimizing aerodynamic losses and maximizing engine efficiency and power.

7. The rigid variable compression ratio crankcase and cylinder jug assembly of claim 2, wherein, cylinder jug (4) further has a contiguous metal casting (62) forming at least a first cylinder jug bearing housing (56) having a cylinder jug bearing surface (58), and a second cylinder jug bearing housing (60) having a cylinder jug bearing socket surface (58), first cylinder jug bearing housing (56) and second cylinder jug bearing housing (60) being located generally on a cylinder bore plane (A) located between first bulkhead plane (B) and second bulkhead plane (C), wherein, first cylinder jug bearing housing (56) has a contiguous metal casting (62) encircling jug bearing socket surface (58), thereby providing a narrow and rigid cylinder jug.

8. The rigid variable compression ratio crankcase and cylinder jug assembly of claim 7, wherein said cylinder jug bearing housings (56 and 60) have an outer cross sectional area (66) measured on said common control shaft plane (E), wherein said outer cross sectional area (66) is at least eight percent of said cylinder bore cross sectional area (34), thereby providing robust bearing support structure.

9. The rigid variable compression ratio crankcase and cylinder jug assembly of claim 7, wherein said cylinder jug bearing surfaces (58) define a common bearing lower plane (H), said common bearing lower plane (H) being parallel to said common control shaft plane (E), said common bearing lower plane (H) being located between said water jacket reference plane (W) and said bottom edge (30), thereby providing a rigid cylinder jug bearing housing.

10. The rigid variable compression ratio crankcase and cylinder jug assembly of claim 7, wherein said cylinder jug (4) further includes a water Jacket (68), said water jacket (68) and said cylinder jug bearing housing (56) having a common lower wall section (70) located on said common cylinder bore plane (A), said lower water jacket section (70) being located between said common control shaft plane (E) and said deck (28), thereby providing a narrow cylinder jug having a deep water jacket.

11. The rigid variable compression ratio crankcase and cylinder jug assembly of claim 1, wherein said cylinder jug (4) further includes structural webbing (72) extending from said cylinder jug bearing housing (56) to said deck (28), thereby providing a rigid cylinder jug structure.

12. The rigid variable compression ratio crankcase and cylinder jug assembly of claim 11, wherein said cylinder jug (4) further includes cylinder head bolt anchorages (74), wherein said structural webbing (72) extends generally from said cylinder jug bearing housing (56) towards said cylinder head bolt anchorages (74), thereby providing a rigid cylinder jug structure.

13. The rigid variable compression ratio crankcase and cylinder jug assembly of claim 12, wherein at least one cylinder jug bearing housing (56) includes a first webbing (72a) extending generally towards a cylinder head bolt anchorage (74) located in said first bulkhead (18), and a second webbing (72b) extending generally towards a cylinder head bolt anchorage (74) located in said second bulkhead (20), thereby providing a rigid cylinder jug structure.

14. The rigid variable compression ratio crankcase and cylinder jug assembly of claim 1, wherein said cylinder jug (4) has deep sockets (76) between adjacent cylinder jug bearing housings (56) and common control shaft plane (E) for providing mechanical clearance from the contiguous metal castings (18) around the crankcase bearing sockets (22).

15. The rigid variable compression ratio crankcase and cylinder jug assembly of claim 14, wherein said cylinder jug (4) has a maximum fitting width (78) for installation of said cylinder jug (4) in said saddle opening width (48) without mechanical interference,
　　said maximum fitting width (78) being measured on said common control shaft plane (E) and on said common first bulkhead plane (B) between said deep sockets (76),
　　wherein said maximum fitting width (78) is no more than ninety percent of said cylinder bore diameter (D).

16. The rigid variable compression ratio crankcase and cylinder jug assembly of claim 15, wherein said deep inner saddle (46) has a saddle opening width (48), said saddle opening width being measured on said common control shaft plane (E),
　　wherein said saddle opening width (48) is no more than 1.12 times said cylinder bore diameter (D).

17. The rigid variable compression ratio crankcase and cylinder jug assembly of claim 14, wherein said cylinder jug (4) further includes cylinder head bolt anchorages (74), wherein said cylinder head bolt anchorages (74) are through drilled into said deep sockets (76).

18. The rigid variable compression ratio crankcase and cylinder jug assembly of claim 1, further having crankshaft bearings (80), a crankshaft lower bearing housing (82) and main fasteners (84) for securing said lower bearing housing (82) to said crankcase (2), and said crankcase (2) further has an oil feed line (86) for supplying oil to said crankshaft bearings (80),
　　wherein said oil feed line (86) crosses at least one main fastener (84) for oil flow around said main fastener (84) to said crankshaft bearing (80).

19. The rigid variable compression ratio crankcase and cylinder jug assembly of claim 1, wherein said cylinder jug (4) further includes a water Jacket (68), and said deck (28) further including a rear bib (88),
　　wherein said rear bib (88) includes a water inlet passage (90) for feeding cooling water into said water jacket (68) from above said deck (28).

20. The rigid variable compression ratio crankcase and cylinder jug assembly of claim 1, wherein said crankcase (2) and cylinder jug (4) assembly further including a thrust bearing (96) thrust bearing (96) being located between a cylinder jug bearing housing (56) and a crankcase bulkhead (20), thereby providing precision alignment of said cylinder jug in said crankcase.

21. The rigid variable compression ratio crankcase and cylinder jug assembly of claim 1, further including an eccentric bushing (100) mounted in said crankcase (2) and a locking fastener (102) for locking said eccentric bushing (100) in place in said crankcase (2).

22. The rigid variable compression ratio crankcase and cylinder jug assembly of claim 1, wherein said crankcase (2) further has external ribbing (104) located on the outer surface of said side walls (44).

23. The rigid variable compression ratio crankcase and cylinder jug assembly of claim 1, further having an end crankcase bearing socket (106) and a rear cover plate (108) for sealing said end bearing socket (106), said eccentric control shaft (24) further having an internal oil galley (110) for supplying oil to said crankcase bearing sockets (22), and said crankcase (2) further having an oil feed galley (114) for supplying oil to said end crankcase bearing socket (106) for feeding oil into said internal oil galley (110).

\* \* \* \* \*